US012694662B2

(12) United States Patent  
Sarkar et al.

(10) Patent No.: US 12,694,662 B2  
(45) Date of Patent: Jul. 28, 2026

(54) REINFORCEMENT LEARNING AGENT TO MEASURE ROBUSTNESS OF BLACK-BOX IMAGE CLASSIFICATION MODELS

(71) Applicant: HEWLETT PACKARD ENTERPRISE DEVELOPMENT LP, Spring, TX (US)

(72) Inventors: Soumyendu Sarkar, Milpitas, CA (US); Ashwin Ramesh Babu, Milpitas, CA (US); Seyed Sajad Mousavi, Milpitas, CA (US); Vineet Gundecha, Bangalore (IN); Sahand Ghorbanpour, Milpitas, CA (US); Avisek Naug, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 354 days.

(21) Appl. No.: 18/486,756

(22) Filed: Oct. 13, 2023

(65) Prior Publication Data

US 2024/0193927 A1     Jun. 13, 2024

Related U.S. Application Data

(60) Provisional application No. 63/430,737, filed on Dec. 7, 2022.

(51) Int. Cl.  
*G06V 10/82* (2022.01)  
*G06T 5/00* (2024.01)  
(Continued)

(52) U.S. Cl.  
CPC ............... *G06V 10/82* (2022.01); *G06T 5/00* (2013.01); *G06T 7/11* (2017.01); *G06V 10/776* (2022.01)

(58) Field of Classification Search  
None  
See application file for complete search history.

(56) References Cited

U.S. PATENT DOCUMENTS

2022/0004913 A1* 1/2022 Nakae ................... G16H 20/70  
2022/0138931 A1* 5/2022 Palma .................... G06T 7/174  
                                                              382/128

(Continued)

OTHER PUBLICATIONS

Alexander D. Camuto, "Understanding Gaussian Noise in Neural Networks," PHD Thesis, St Hugh's College, University of Oxford, 2021 (Year: 2021).*

(Continued)

*Primary Examiner* — Soo Shin  
(74) *Attorney, Agent, or Firm* — Sheppard Mullin Richter & Hampton LLP

(57) ABSTRACT

Systems and methods are provided for reinforcement Learning agents for adversarial black-box attacks to determine and refine robustness of a machine learning (ML) model. Examples include receiving an image corresponding to a ground truth and computing sensitivity of an ML model in classifying the image as the ground truth to added and removed distortions. An RL agent determines to add distortions to and remove distortions from the image based on the sensitivities. The ML Model classifies the image based on the added and removed distortions, and the process is repeated until the machine learning model misclassifies the image. Based on the misclassification, a measure of robustness is determined and/or the ML model can be retrained.

18 Claims, 8 Drawing Sheets

(51) Int. Cl.
     *G06T 7/11*          (2017.01)
     *G06V 10/776*       (2022.01)

(56)                    References Cited

U.S. PATENT DOCUMENTS

| | | | |
|---|---|---|---|
| 2022/0139531 A1* | 5/2022 | Wang ..................... | G16H 50/20 |
| | | | 382/128 |
| 2022/0332335 A1* | 10/2022 | Milton ................... | G06N 3/098 |

OTHER PUBLICATIONS

Co et al., "Procedural Noise Adversarial Examples for Black-Box Attacks on Deep Convolutional Networks," In 2019 ACM SIGSAC Conference on Computer and Communications Security (CCS '19), Nov. 11-15, 2019, London, United Kingdom. https://doi.org/10.1145/ 3319535.3345660 (Year: 2019).*

Duan et al., "Mask-guided noise restriction adversarial attacks for image classification," Computers & Security 100 (2021) 102111, https://doi.org/10.1016/j.cose.2020.102111 (Year: 2021).*

"Robustness with Black-Box Adversarial Attack using Reinforcement Learning?", 37th AAAI Conference of Artificial Intelligence: Workshop on Artificial Intelligence Safety (SafeAI), Feb. 13-14, 2023, 9 pages.

Anonymous, "RLAB: Reinforcement Learning Platform for Adversarial Black-box Attack", CVPR, 2023, 10 pages.

Sarkar et al., "Measuring Robustness with Black-Box Adversarial Attack using Reinforcement Learning", 36th Conference on Neural Information Processing Systems, 2022, 8 pages.

* cited by examiner

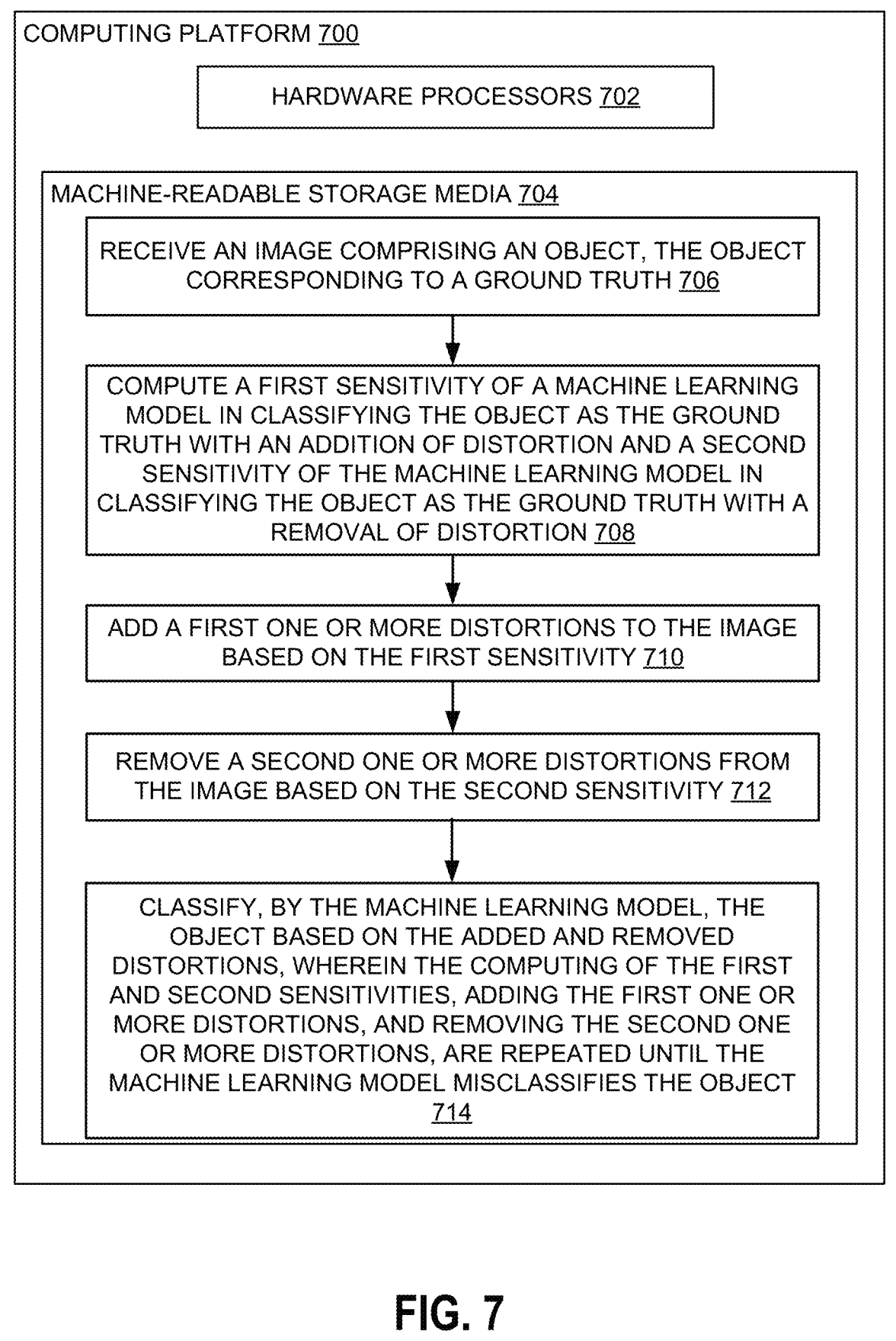

COMPUTING PLATFORM 700

HARDWARE PROCESSORS 702

MACHINE-READABLE STORAGE MEDIA 704

RECEIVE AN IMAGE COMPRISING AN OBJECT, THE OBJECT CORRESPONDING TO A GROUND TRUTH 706

COMPUTE A FIRST SENSITIVITY OF A MACHINE LEARNING MODEL IN CLASSIFYING THE OBJECT AS THE GROUND TRUTH WITH AN ADDITION OF DISTORTION AND A SECOND SENSITIVITY OF THE MACHINE LEARNING MODEL IN CLASSIFYING THE OBJECT AS THE GROUND TRUTH WITH A REMOVAL OF DISTORTION 708

ADD A FIRST ONE OR MORE DISTORTIONS TO THE IMAGE BASED ON THE FIRST SENSITIVITY 710

REMOVE A SECOND ONE OR MORE DISTORTIONS FROM THE IMAGE BASED ON THE SECOND SENSITIVITY 712

CLASSIFY, BY THE MACHINE LEARNING MODEL, THE OBJECT BASED ON THE ADDED AND REMOVED DISTORTIONS, WHEREIN THE COMPUTING OF THE FIRST AND SECOND SENSITIVITIES, ADDING THE FIRST ONE OR MORE DISTORTIONS, AND REMOVING THE SECOND ONE OR MORE DISTORTIONS, ARE REPEATED UNTIL THE MACHINE LEARNING MODEL MISCLASSIFIES THE OBJECT 714

FIG. 7

REINFORCEMENT LEARNING AGENT TO MEASURE ROBUSTNESS OF BLACK-BOX IMAGE CLASSIFICATION MODELS

CROSS-REFERENCE TO RELATED APPLICATION

This application claims the benefit of and priority to U.S. Provisional Application No. 63/430,737, filed on Dec. 7, 2022, the contents of which is incorporated herein by reference in its entirety.

BACKGROUND

Artificial neural networks (ANN) and the machine learning (ML) algorithms used to create ANNs have the ability to learn from large data sets. ANNs are computing systems inspired by biological neural networks. Deep learning (also referred to as deep neural networks or DNNs) is based on ANNs and feature learning. Feature learning is a set of techniques that allows a system to automatically discover representations needed for feature detection or classification from input data. Deep learning uses multiple layers to progressively extract higher-level features from raw input data for recognizing or classifying the raw input data.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 7 is an example computing component that may be used to implement various features of adversarial black-box attacks in accordance with the implementations disclosed herein.

Figure 1:
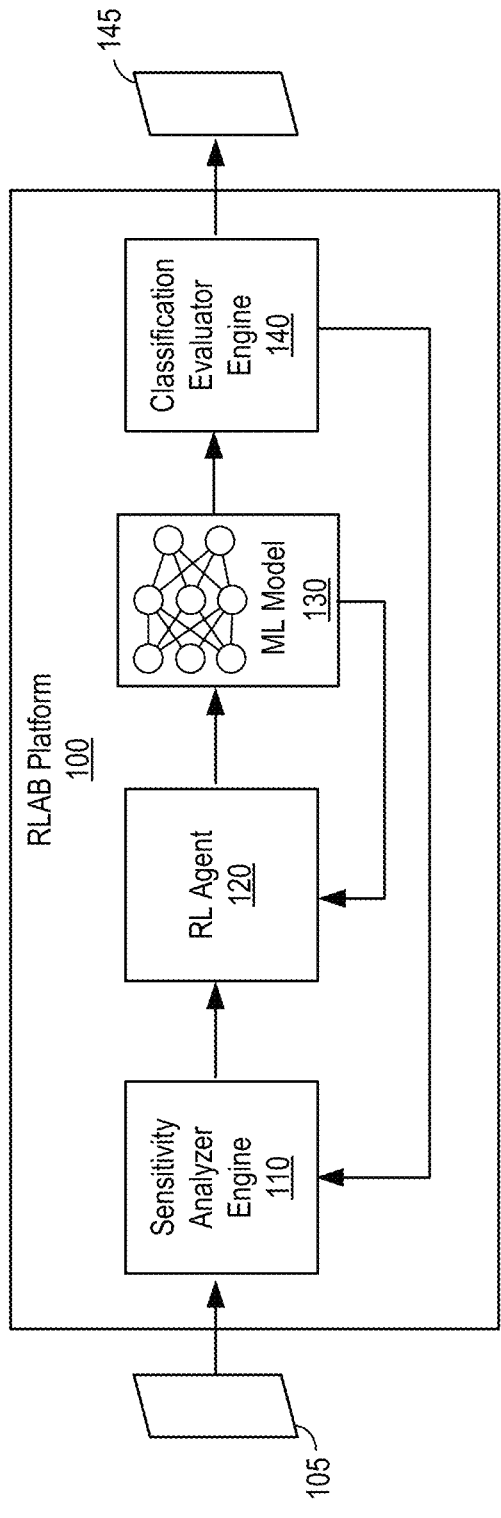
FIG. 1 is an example architecture of an Reinforcement Learning for adversarial black-box attacks platform in accordance with implementations of the present disclosure.

The figures are not exhaustive and do not limit the present disclosure to the precise form disclosed.

DETAILED DESCRIPTION

Deep learning has been employed in a wide variety of applications, such as but not limited to, image processing/recognition, autonomous systems, health care applications for disease diagnosis, text translation, robotic control systems, and facial recognition, among other applications. However, these models can suffer from a vulnerability in which small distortions in input data can lead to wrong predictions. For example, naturally occurring distortions can affect input data leading to wrong misclassifications and inaccurate predictions. These inaccurate predictions can translate to increased concerns when relied upon for safety-critical applications, such as, but not limited to, self-driving cars, facial recognition, and image-based authorization. Measuring robustness, i.e., how resilient a model is against distortions and misclassifications, can identify vulnerabilities of poorly trained models. Quantifying robustness can also be important for retraining classification models to improve model performance in predictions for classifying input data.

One approach to assessing robustness is through adversarial attacks. An adversarial attack may, for example, use input data designed to fool a trained machine learning model into causing wrong predictions through injection of purposefully deceitful input data. This purposefully deceitful input data can be referred to herein as an "adversarial sample" that is meant to deceive classifiers of the model. Generally, there are two approaches to adversarial attacks: white-box attacks that rely on complete visibility into the model to create adversarial samples and black-box attacks that create adversarial samples without a priori knowledge of the model.

Recent works have introduced white-box attack approaches that target a specific region or add minimum distortion to fool Convolutional Neural Network (CNN) models. However, as noted above, white-box attacks rely on complete visibility into the architecture of the CNN and model parameters. Visibility may refer to an approach's ability to use information of a model that is under evaluation (e.g., training data a model is trained on, model architecture, model parameters, output probability distribution, or any information about a model itself) to provide for and implement a robustness evaluation. White-box attacks take advantage of this model information. However, visibility into a model is generally not practical in many real-world applications.

Black-box attack approaches do not require complete visibility. However, conventional black-box approaches can suffer from inefficiency and may require too many queries to create an adversarial sample that could fool the model under evaluation. For example, the vulnerability or inaccuracy of a model under evaluation can be measured by adding distortions to input data to create a distorted sample (also referred to herein as an altered sample or perturbed sample), supplying the distorted sample to a model, and examining the output classification probabilities. A change in the output (e.g., a change in classification having the highest probability) signifies that the model has become uncertain about the classification and, at this point, the distorted sample can be considered an adversarial sample. This process of creating and passing a distorted sample to the model under evaluation and evaluating the output classification probabilities can be referred to as a query. Each iteration of creating and passing a distorted image to the model can be considered a single query. Queries can be used as metrics that measure efficiency of the proposed evaluation method by counting how many queries are executed to cause a change in output of the model (e.g., produce an adversarial sample). A more efficient evaluation method results in fewer queries, with an aim to minimize the number of queries. Generally, in black-box attack approaches there is no information (or minimal information) of the model under evaluation. This aspect can make it more challenging to strategize as to how to add distortions, which type of distortions to add, and where in the input data to add distortions. Thus, more queries may be needed to cause the model under evaluation to change its classification.

Furthermore, many conventional black-box attacks are designed for specific types of unnatural distortions and are based on hand-crafted heuristics, which have limitations. For example, a conventional black-box attack is generally designed to add a specific type of unnatural distortions to input data for generating an adversarial sample. The unnatural distortions are generally designed specifically for the black-box attack. Thus, there is no guarantee that the design would work for other types of distortions, particularly to naturally occurring distortions.

Implementations disclosed herein overcome these technical shortcomings, among others, by providing for systems and methods that provide for a Reinforcement Learning (RL) agent for adversarial black-box attacks (RLAB) and platforms for executing the same. Metrics for quantifying performance of a robustness evaluation include success rate as measured by number of adversarial samples misclassified by the model under evaluation), the amount of distortions added as measured as $L_p$-norm and a count of the number of queries to induce a misclassification. Examples of the RL agents disclosed herein can be configured to learn an optimal policy that provides for robustness evaluation with improved metrics. For example, the RL agents disclosed herein can generate an adversarial sample with fewer queries relative to conventional black-box attacks and an increased success rate, even up to 100%, while maintaining minimum distortions to induce misclassification. For example, the disclosed implementations leverage RL to learn a policy that incrementally adds distortions to input data to deceive a trained machine learning (ML) model, unlike the hand-crafted heuristics used in some conventional adversarial black-box attacks. The present disclosure also provides for dual action through parallel addition and removal of distortions to regions of input data, based on sensitivity information of an input image at a current state (or iteration) of the RL agent and a history of distortions that were added/removed in previous states (or iterations) of the RL agent. By learning an optimum policy and leveraging parallelly added/removed distortions, the implementations disclosed herein can generate an adversarial sample that causes a misclassification with a minimal number of queries and distortions relative to conventional approaches.

Furthermore, the implementations according to the present disclosure offer versatility in applicable distortions. For example, the technology disclosed herein can utilize one or more filters to input data for applying different types of distortions. Examples of naturally occurring distortion types that can be applied include, but are not limited to, Gaussian noise, Gaussian blur, brightness, and dead pixels. Filters for applying any type of distortions can be used, which need not be limited to naturally occurring distortions. Accordingly, the implementations disclosed herein provide for an RLAB platform that can be implemented, irrespective of distortion type, and capable of adding naturally (as well as unnaturally) occurring distortions to generate adversarial samples. As a result, robustness of an ML model on naturally occurring distortions can be quantified, which can be more informative for real-world applications. Furthermore, the ML model can be retrained on adversarial samples containing such distortions, thereby training the ML model on these naturally occurring distortions.

In an example implementation, the RLAB platform includes an RL agent that can be trained to generate an adversarial sample from input data, such that the adversarial sample has a minimum amount of distortion that induces misclassification by an ML model. The ML model can include a trained classification model (also referred to as a classifier) that classifies information contained in the input data (e.g., objects in the case of an input image) according to probabilities computed by the ML model for a number of classes (e.g., labels or classifications). The input data may correspond to a ground truth class that represents the information that the input data actually contains. The ML model computes a probability for the ground truth class (referred to herein as a ground truth probability), along with probabilities for a k-number of other classes that are not the ground truth class (e.g., non-ground truth probabilities). A misclassification occurs when the ML model computes a non-ground truth probability that is greater than the ground truth probability.

In an example implementation, the RLAB platform uses input image to generate an adversarial sample in the form of an adversarial image (e.g., purposefully deceitful image data meant to deceive classifiers of a model). In this example, upon receipt of the input image, the RLAB platform divides the input image into a number of regions. For each region, the RLAB platform determines sensitivity information, of a classification model in classifying the input image, to distortions. The sensitivity information can be mapped to the regions of the input image and provided to the RL agent. In various examples, the sensitivity information includes a first sensitivity of the ground truth probability to added distortions computed for each region of the input image. The sensitivity information can also include a second sensitivity of the ground truth probability to removal of distortions computed for each region. The first and second sensitivities can be mapped to the regions to generate first and second sensitivity maps. Using the first and second sensitivity maps as states of the input image, the RL agent identifies a first one or more regions of the input image for adding of distortions and a second one or more regions for removal of distortions. In various examples, the first and second one more regions may each comprise, for example, one or more pixels of the input image on the case of digital image data. In some examples, distortions may have been previously added to the input image, for example, during a prior iteration (or step) executed by the RLAB platform. The RL agent can also determine an amount of distortion and type of distortion to add and/or remove from the first and second one or more regions, respectively. The RL agent then generates a first distortion mask for adding a first one or more distortions to the identified first one or more regions and a second distortion mask for removing a second one or more distortions from the identified second one or more regions. The RLAB platform applies the first and second distortion masks to the input image, which generates a candidate adversarial sample (e.g., a distorted image as described above). The candidate adversarial sample is the input image having the first one or more distortions added to the identified first one or more regions and the second one or more distortions removed from the identified second one or more regions. The candidate adversarial sample is then applied to the trained classification model, which computes a ground truth probability and non-ground truth probabilities. The process is repeated through multiple iterations until the classification model misclassifies the object contained in the input image, at which point the candidate adversarial sample can be considered an adversarial sample.

At each iteration of the process, the RLAB platform computes a reward from a change in the ground truth probability and a change in total added distortion with respect to the preceding iteration. The reward is supplied to the RL agent to inform the RL agent on the effectiveness of the action taken during the preceding iteration. Through a plurality of iterations, the RL agent uses the rewards from preceding iterations to learn an optimum policy for deciding which first one or more regions in which to add distortions and which second one or more regions from which to remove distortions for a current iteration. The rewards can also be used to determine which type of distortion and an amount of distortions to add or remove.

Once the classification model misclassifies the object, a measure of robustness of the classification model can be determined by the RLAB platform. For example, the RLAB platform can measure a total amount of distortion added to the adversarial sample relative to the original input image at an initial iteration. The total amount of distortions may be cumulative of all added distortions minus all removed distortions. In another example, total distortions may be a total added distortion at the iteration in which the misclassification occurred.

In some implementations, adversarial samples generated by the presently disclosed technology can be used to refine or retrain an ML model, which can increase the robustness of the ML model. For example, a classification model can be retrained on adversarial samples so to learn how to classify inputs containing distortions that the classification model may be particularly sensitive too. Retraining on these adversarial samples, which contain minimal and natural distortions of input data, can improve the classification model's accuracy and robustness in classifying input data containing naturally occurring and relatively minimal distortions. As a result, after the retraining, the trustworthiness of classifications output by the classification model can be increased due to the improved accuracy and robustness.

It should be noted that the terms "optimize," "optimal" and the like, as used herein, can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 is an example architecture of an RLAB platform 100 in accordance with implementations of the present disclosure. The RLAB platform 100 is configured to learn an optimum policy for generating adversarial samples. The RLAB platform 100 comprises ML model 130 provided as a classification model, a sensitivity analyzer engine 110 configured to compute sensitivity information of the ML model 130, an RL agent 120 configure to learn the optimum policy, and a classification evaluator engine 140 to determine when a misclassification has occurred and output an adversarial sample.

According to various examples ML model 130 may be a classification model trained to classify information contained in input data 105. Input data 105 contains information that represents a ground truth class. The ML model 130 computes probabilities for a plurality of classes from input data 150, including a ground truth probability for the ground truth class. In some examples, ML model 130 can classify the input data 105 according to a class having the highest computed probability.

The RLAB platform 100, according to various examples disclosed herein, treats ML model 130 as a black box. RLAB platform 100 may have no or partial visibility into the ML model 130, such as the architecture or the parameters of the ML model 130. Thus, RLAB platform 100 may see only the input data 105 and the output classifications (e.g., computed probabilities and classes). Because the ML model 130 is treated as a black box, the ML model 130 can be implemented as any ML model known in the art, such as but are not limited to, deep learning models (e.g., CNNs, Recurrent Neural Networks (RNNs), etc.), any classification model, etc.

The sensitivity analyzer engine 110 may be configured to compute sensitivity information of the ML model 130, in classifying the input data 105, to distortions contained in the input data 105. For example, sensitivity analyzer engine 110 can compute a first sensitivity of ML model 130 in computing a ground truth probability to added distortions and a second sensitivity of the ML model 130 in computing the ground truth probability to removed distortions. From the first and second sensitivities, sensitivity analyzer engine 110 can generate one or more sensitivities maps. For example, first and second sensitivities can be computed for a plurality of regions of the input data 105 and mapped to those regions. In one example, sensitivity analyzer engine 110 can output a single map containing the first and second sensitivities mapped to the plurality of regions of the input data 105. In another example, sensitivity analyzer engine 110 can output a first sensitivity map of the first sensitivities mapped to the plurality of regions of the input data 105 and a second sensitivity map of the second sensitivities mapped to the plurality of regions of the input data 105.

In either case, sensitivity analyzer engine 110 outputs the computed sensitivity information to an RL agent 120. The RL agent 120 uses the sensitivity information as states to learn an optimal policy for determining an amount of distortions to add to the input data 105 that will induce a misclassification of the input data 105 by the ML model 130. To achieve this, the RL agent 120, based on the first sensitivity information, determines a first one or more regions of input data 105 into which distortions can be added, a type of distortion to add to each of the first one or more regions, and an amount of distortion to add to each of the first one or more regions. Further, the RL agent 120, based on the second sensitivity information, determines a second one or more regions of input data 105 in which distortions can be removed, a type of distortion to remove from each of the second one or more regions, and an amount of distortion to remove from each of the second one or more regions.

The RL agent 120 adds and removes the determined distortions to the input data 105 to generate candidate adversarial data. The candidate adversarial data is provided to the ML model 130 for classification and the ML model 130 computes probabilities for the plurality of classes. The ML model 130 outputs classification results in the form of computed probabilities for each class along with the classes themselves to a classification evaluator engine 140.

The classification evaluator engine 140 determines if a misclassification has occurred based on the computed probabilities. For example, classification evaluator engine 140 compares a ground truth probability ($P_{GT}$) to non-ground truth probabilities to determine if a misclassification has occurred. If the highest probability is the ground truth class, e.g., the ground truth probability ($P_{GT}$) is the largest probability, then classification evaluator engine 140 determines that a misclassification has not occurred. In this case, classification evaluator engine 140 can supply the candidate adversarial data to the sensitivity analyzer engine 110 as an updated input data 105 and the process repeats. If classification evaluator engine 140 determines a misclassification has occurred (e.g., a probability for another class is higher than the ground truth probability ($P_{GT}$)), classification evaluator engine 140 outputs the candidate adversarial data as an adversarial data 145, along with a measure of the total distortion added provided by the RLAB platform 100 as a $L_2$-norm and the computed probabilities.

The RL agent 120 may be provided as an ML algorithm that receives states in the form of the sensitivity information of a current iteration and rewards in the form of effectiveness of actions taken during previous iterations. The RL agent 120 comprises an RL algorithm that trains the RL agent 120 on a policy configured to optimize a cumulative reward representative of the effectiveness of past actions based on current states of the input data 105. The policy applied by the RL agent 120 is aimed to minimize the amount of distortion to be added to input data 105 that result in a misclassification by ML model 130. Through removal of distortions from the input data 105 based on the reward, the RL agent 120 can remove distortions that turned out to be less impactful in causing a misclassification relative to other distortions to be added in the current iteration. For example, after analyzing the effectiveness of past actions and in view of the current state of the input data 105, the RL agent 120 can remove those distortions that the ML model 130 is less sensitive to, in favor of adding distortions that the ML model 130 is more sensitive to.

At each iteration, the ML model 130 computes a reward for the current iteration and supplies the reward to the RL agent 120 for use in determining actions for the next iteration. The reward can be computed from a change in ground truth probability ($\Delta P_{GT}$) and a change in total added distortion ($\Delta L_2$-norm), where $L_2$-norm represents a measure of total distortion of an input. The $\Delta P_{GT}$ is the ground truth probability of a current iteration ($P_{GT,i}$) minus the ground truth probability of an immediately preceding iteration ($P_{GT,i-1}$). Similarly, $\Delta L_2$-norm is the total distortion for the current iteration ($L_2$-norm$_i$) minus the total distortion for the immediately preceding iteration ($L_2$-norm$_{i-1}$). This information, provided as the reward, can be used by the RL agent 120 to inform RL agent 120 on how impactful a preceding iteration was in misclassifying input data 105, which the RL agent 120 can use to evaluate how to add and remove distortions for a next iteration.

In various examples, once a misclassification occurs, RLAB platform 100 can be configured to determine the robustness of the ML model 130. For example, robustness can be measured as a total distortion that has been added to input data 150 (e.g., $L_2$-norm) following the iteration in which the misclassification (e.g., resulting in adversarial data 145) occurred relative to the original input image 105 (e.g., prior to the first iteration). For example, the total distortion contained in adversarial data 145 relative to the original input data 105 can provide a total distortion added that causes misclassification. The total distortion may be cumulative of all distortions added minus all distortions removed through execution of RLAB platform 100. In another example, total distortions may be a total added distortion following the iteration in which the misclassification occurred.

Figure 2:
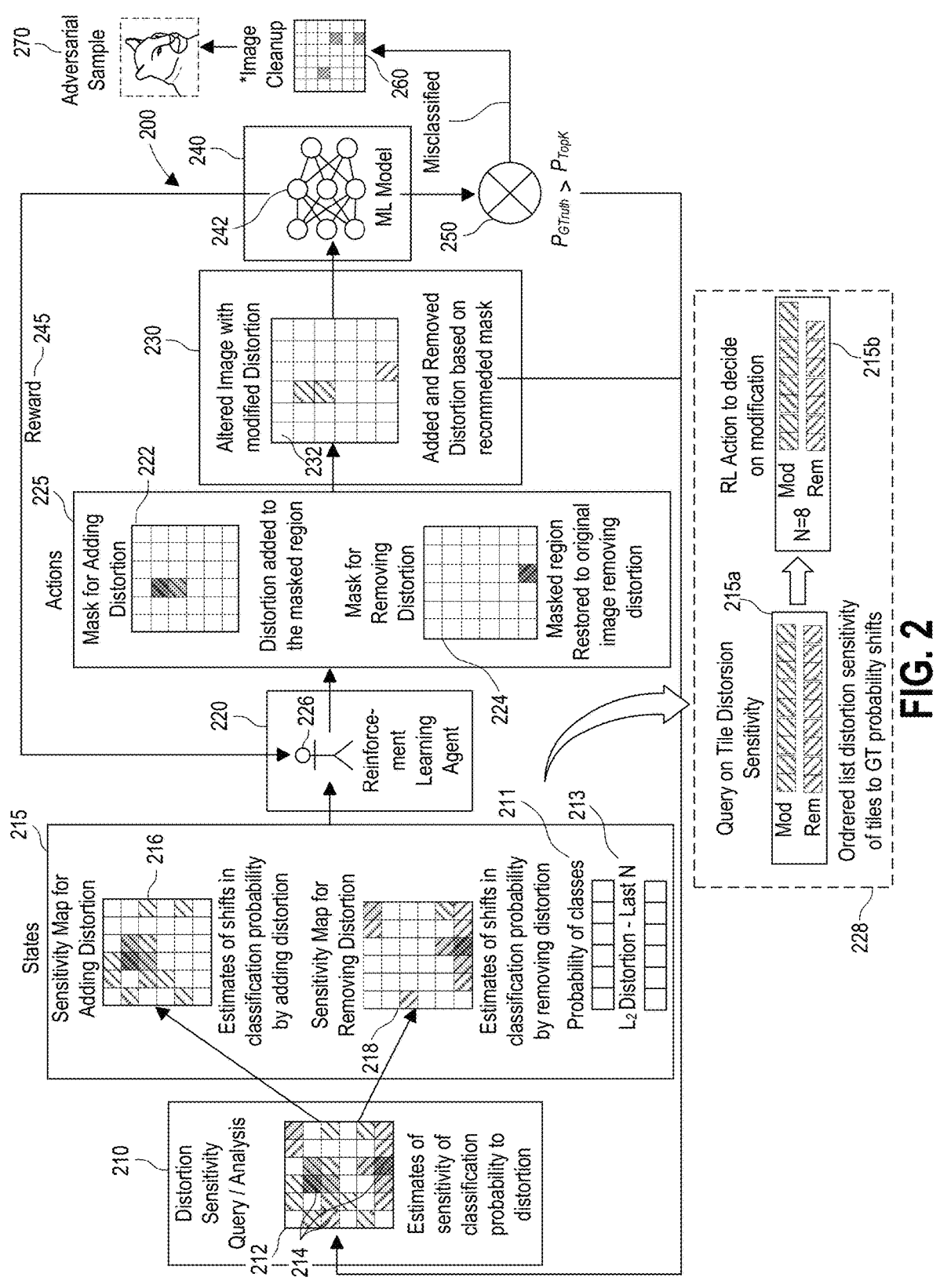
FIG. 2 an example process flow for generating an adversarial sample for an adversarial black-box attack in accordance with implementations of the present disclosure.

FIG. 2 is an example process flow 200 for generating an adversarial sample for an adversarial black-box attack in accordance with implementations of the present disclosure. The process flow 200 may be performed on the RLAB platform 100 of FIG. 1. While the following description is made with reference to an input image 212, the implementations disclosed herein are not limited to image data. Any type of input data may be used.

Process flow 200 includes a sensitivity analysis operation 210 that can be executed, for example, by sensitivity analyzer engine 110 of FIG. 1. Sensitivity analysis operation 210 divides an input image 212 (e.g., an example of input data 105) into a plurality of regions 214. Regions 214 are shown as patches or squares in this example, but other implementations can be used. Sensitivity analysis operation 210 computes sensitivity information by estimating, for each region 214, a sensitivity for each class probability computed by ML model 242 (e.g., an example of ML model 130), in classifying the input image 212, to the added and removed distortions. Sensitivity analysis operation 210 generates sensitivity information in the form of sensitivity maps 216 and 218, which are provided as state information (or data) 215. Sensitivity map 216 provides estimated sensitivities to added distortions mapped to each region 214. Sensitivity map 218 provides estimated sensitivities to removed distortions mapped to each region 214.

State information 215 can also include aspects from previous iterations of the process flow 200. For example, a vector structure 211 of probabilities for each class computed by image alteration operation 230 in a preceding iteration can be included as state information 215. Similarly, the $L_2$ distortions of one or more preceding iterations can be provided as vector structure 213 included as state information 215. Structure 213 may include $L_2$ distortions relative to the original input image 212 for the a previous N iterations, where N can be any integer (e.g., 4 in this example).

Sensitivity analysis operation 210 provides the sensitivity maps 216 and 218 to an RL operation 220 as a response to a query by the RL operation 220 for current states of the input image 212. RL operation 220 executes an RL agent 226 (e.g., an example implementation of RL agent 120 of FIG. 1) to determine actions 225 based on a cumulative reward and state information 215. RL operation 220 determines regions 214 for adding or removing distortions, as well as what type of distortion and an amount of distortion (e.g., $L_2$-norm). These determinations are output as distortion masks 222 and 224 by the RL agent 226. Distortion masks 222 is a mask for adding distortions to one or more regions of the input image and distortion masks 224 is a mask for removing distortions from one or more regions. The distortion masks 222 and 224 are applied to the image at image alteration operation 230, which generates a candidate adversarial image 232 by applying the distortion masks 222 and 224 to the input image 212.

The candidate adversarial image 232 is provided to a classification operation 240, which executes an ML model 242 to classify candidate adversarial image 232. The ML model 242 comprises a classification model (or classifier) that computes probabilities for classes and infers a classification of contents of the input image 212 based on the probabilities. For example, the ML model 242 computes a ground truth probability that the input image 212 is a ground truth class and probabilities for a k-number of non-ground truth classes. The ML model 242 classifies the input image 212 according to the class having the highest probability.

The ML model 242 also computes a reward information 245 that is supplied to the RL operation 220 for use in determining actions 225. The reward information 245 is based on a change in ground truth probability between iterations of the process flow 200 and a change in total added distortion between iterations of process flow 200. Thus, the reward information 245 is a cumulative reward of the effectiveness of the current action, which, through the addition and removal of distortions, considers effectiveness of all past actions. The RL agent 226 uses the reward information 245 to learn a policy for transitioning state information 215 to actions 225, as described in greater detail below.

The probabilities computed at classification operation 240 are provided to a comparison operation 250, which compares the ground truth probability ($P_{GT}$) to the largest probability of the k-numbered non-ground truth classes ($P_{TopK}$). If $P_{GT}$ is greater than $P_{TopK}$, then the candidate adversarial image 232 is provided to sensitivity analysis operation 210 and process flow 200 is repeated for a subsequent iteration. If $P_{GT}$ is equal to or less than $P_{TopK}$, then comparison operation 250 determines a misclassification has occurred. The candidate adversarial image 232 is then considered an adversarial sample 270 and provided as an image, in this example. Comparison operation 250 may be one example of classification evaluator engine 140 of FIG. 1.

In further detail, the ML model 242 may be DNN, CNN, or the like, that is to be evaluated. The ML model 242 can be represented as y=argmax f(x; θ), where x denotes the input image 212, y represents the classification prediction, and θ represents model parameters. A non-targeted black-box attack without access to the θ generates a distortion δ such that, y≠argmax f(x+δ; θ). The adversarial sample 270 can be represented as D(x, x+δ). The distance in terms of distortion between the original input image 212 and adversarial sample 270 that results in misclassification will be a function of the $L_p$ norms, such as $L_2$-norm, $L_1$-norm, $L_{inf}$-norm, and the like. The objective is to fool the ML model 242 into misclassification while keeping δ, and thus D, to a minimum.

Process flow 200 can be extremely versatile in the sense that it can add and/or remove any type of distortion. Distortions can be added or removed through application of one or more filters to an input image, where the filters can be configured to add or remove one or more types of distortions. The filters can be adapted to add or remove distortions, such that a resulting image is the input image altered by the filter. The RL agent 226 can learn a policy, through iteration of 200, to adapt one or more filters such that a candidate adversarial sample is generated with minimum distortion δ. Further, the RL agent 226 can apply a mixture of filters. For example, RL agent 226 may determine which type of distortion filter to use during a given iteration and decide on the number of regions 214 to which the filter will be applied. The RL agent 226 repeats this determination for each of a number of filters, based on the policy, to apply any number of filters to regions 214 during a single iteration. As noted above, this configuration can be well suited for more commonly encountered and naturally occurring distortions, such as, but not limited to, Gaussian Noise, Gaussian Blur, dead pixels, and brightness. Gaussian noise, for example, is a distortion that is commonly encountered and naturally occurring.

Figure 3:
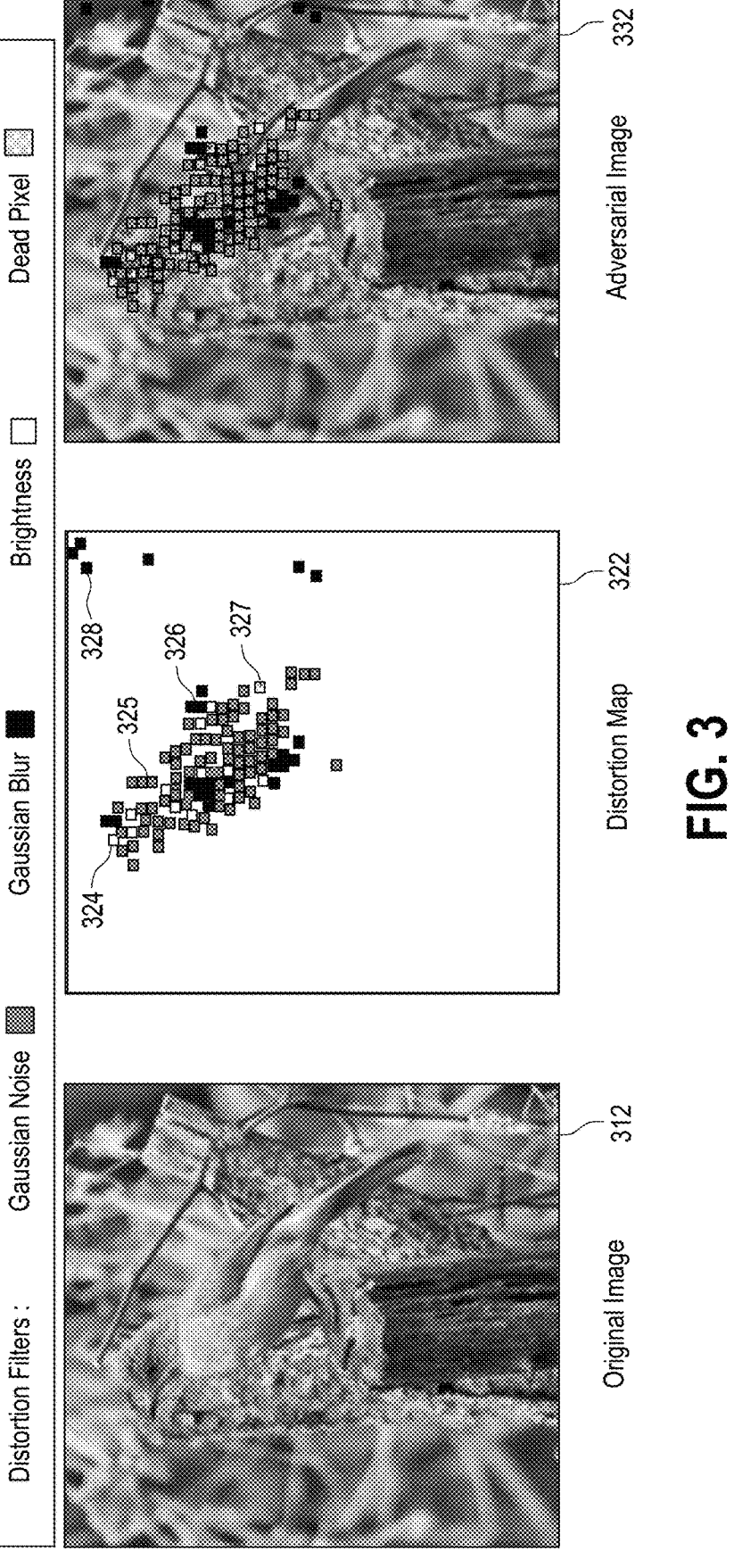
FIG. 3 illustrates an example of an input image, distortion mask, and candidate adversarial image that can be generated during the process flow of FIG. 2.

FIG. 3 illustrates an example an input image 312, an example distortion mask 322, and an example candidate adversarial image 332. The candidate adversarial image 332 is result of applying the distortion mask 322 to the input image 312. The input image 312 contains a bird as the ground truth and is an example image that can be used for input image 212. Distortion mask 322 is an example of distortion mask 222 for adding distortion of a number of different distortion types, such as Gaussian noise 324, Gaussian blur 325, brightness 326, and dead pixels 327, in this example. Candidate adversarial image 332 is an example of candidate adversarial image 232 for illustrative purposes only. In the example of FIG. 3, the distortions depicted are enlarged in size and effect to demonstrate the alteration, but it will be appreciated that, in an actual implementation, distortions may be more subtle and even unnoticeable to a human eye. As described above, the locations of distortions are selected based on sensitivity information (e.g., as obtained from sensitivity analysis operation 210) so to be added (or removed) at regions of the input image 312 that the ML model is particularly sensitive to for misclassification. That is, for example, many of the distortions are positioned along the body of the bird shown in input image 312, which is likely to induce a misclassification. However, note that certain distortions (e.g., distortions 238, which are Gaussian blur distortions in this example) can be positioned elsewhere, which themselves could also induce a misclassification of the bird.

Returning to FIG. 2, as described above, input image 212 is divided into a plurality of regions 214. For example, input image 212 can be divided into a number of n×m sized regions, where n and m may be the same or different. In the case of digital images, n and m are integers representing a number of pixels. In another example, n and m may represent a unit of distance for defining a size of each region, one or more bits of data, etc. As shown in FIG. 2, the regions may be square. While a certain number of regions are shown in FIG. 2, the implementations disclosed herein are not limited to the example shown. Input image 212 can be divided into any number of regions of any desired shape. Note that as the number of regions increases, the size of each region decreases. However, the number of queries for sensitivity information may decrease as the number of regions increase, but the total distortion added ($L_2$-norm) may increase due to more regions being analyzed. Thus, a tradeoff in region size and performance may exist that can be balanced as desired for a given application.

Once input image 212 is divided into regions, the sensitivity of the ground truth probability ($P_{GT}$) to the addition of and to the removal of distortions can be computed on a region by region basis. Using this sensitivity information, the RL agent 226 takes the following actions: identifies regions into which distortions are to be added, adds distortions to the identified regions, identifies regions from which distortions are to be removed, and removes distortions from the identified regions.

This process is done iteratively until the ML model 242 misclassifies the input image 212. In some examples, the process can be iterated until a set budget of a number of maximum allowed iterations is reached, for example, where a misclassification does not occur after performing the maximum number of iterations. Once the adversarial sample 270 is generated, in some implementations, image cleanup operation 260 can be iteratively executed as a post-processing step to further minimize distortion δ. In the case of a mixed filter (e.g., multiple distortion types), the RL agent 226 may need to choose an optimal type of distortion and the corresponding filter for each step of the image cleanup operation 260.

As an example implementation of the sensitivity analysis operation 210, distortion masks 222 and 224 can be generated having the same size and number of regions as the divided input image 212. Depending on the type of distortion to be analyzed, distortion (or noise) may be applied to each region 214 as a filter having the hyperparameters that define attributes of the distortion, such as but not limited to, the distortion levels, brightness level, etc. The hyperparameters may be fixed throughout each iteration. The distortion masks can be sampled from a normal distribution as represented as follows:

$$\text{Distortion Mask}(n \times n) = NormalDistribution(0, \text{Noise\_level}) \qquad \text{Eq. 1}$$

The distortion masks 222 and 224 can be iteratively applied across all regions 214 to evaluate drift (e.g., change) in the ground truth probability $P_{GT}$ as a function of region. Hyperparameters associated with the distortion masks can be chosen to be as minimum as possible to provide more granular addition of distortion in successive steps. This granular addition controls the $L_p$ norm. In a multi-filter implementation, where the RL agent 226 has a choice of filters, the hyperparameters for the individual filters can be chosen such that the impact on $L_p$ norm is the same after application of any filter. Note hyperparameters can be chosen based on the performance-cost trade-off. For example, as the size of the regions 214 decreases (e.g., number of regions 214 increases), the average $L_2$-norm distance also increases.

The state information 215 can be provided as one or more vectors. The sensitivity maps 216 and 218, illustratively shown as grids or matrices in this example, can be converted to vectors using the sensitivity information. For example, vectors $LIST_{ADD}$ and $LIST_{REMOVE}$ can be provided as lists of regions 214 ordered based on the drift in $P_{GT}$ for each region 214 during addition and removal of distortions, respectively. $LIST_{ADD}$ can be a vector representing a listing of each region 214 from sensitivity map 216 in descending order of normalized sensitivity of $P_{GT}$ to addition of distortion. $LIST_{REMOVE}$ can be a vector that represents the listing of each region of sensitivity map 218 in ascending order of normalized sensitivity of $P_{GT}$ to removal of distortion. In addition, probabilities of each class ($LIST_{PROB}$) and the $L_p$ norm can be provided as vectors in the state information 215. For example, $LIST_{PROB}$ is a vector (shown as vector structure 211) representing a listing of probabilities for various classes for classifying the object of the image, including a ground truth class. $LIST_{L2}$ is a vector (shown as vector structure 213) representing a listing of total distortions or $L_2$-norm distance, in this example, from the original input image 212 for the last N iterations, where N can be any integer (e.g., 4 in this example). Table 1 below provides an example of the state information 215.

TABLE 1

| | |
|---|---|
| $LIST_{ADD}$ | Square patches in descending order of normalized sensitivity to addition of distortion |
| $LIST_{REMOVE}$ | Square patches in ascending order of normalized sensitivity to removal of distortion |
| $LIST_{PROB}$ | Classification probability of various classes at this step |
| $LIST_{L2}$ | L2 distance from original for the last $N_{steps} = 4$ steps |

For each iteration of process flow 200, the RL agent 226 receives state information 215 of a current iteration and cumulative reward information 245 computed during a preceding iteration and applies the information to a learned policy that maximizes the reward function of current iteration. The policy is optimized (e.g., learned) through multiple iterations which seeks to maximize the reward in function during each iteration. For a given iteration, the RL agent 226 queries sensitivity analysis operation 210 to obtain the sensitivity information and obtain state information 215 as ordered lists or vectors (e.g., $LIST_{ADD}$, $LIST_{REMOVE}$, $LIST_{PROB}$, and $LIST_{L2}$).

As an example, at decision operation 228, the received vectors 215a can be applied to a learned policy to identify one or more regions to act on and whether to add or remove distortions to the identified regions so to maximize the reward function. The determined regions 214 can be used to create vectors 215b, which are lists of the identified regions and determined distortions to be added or removed. The decision is informed by the reward information 245 of the prior iteration as shown in FIG. 2. For example, at each iteration, the RL agent 226 chooses a number of regions 214 ($N_{ADD\_DIST}$) from the $LIST_{ADD}$ to which distortions will be added and chooses a number of regions 214 ($N_{REM\_DIST}$) from the $LIST_{REMOVE}$ for which distortions will be removed. The $N_{ADD\_DIST}$ and $N_{REM\_DIST}$ are provided as vectors 215b and labeled as "Mod" and "Rem", respectively. In the example shown in FIG. 2, the $N_{REM\_DIST}$ is kept less than $N_{ADD\_DIST}$ so that distortions are progressively added at each step to keep the number of queries optimally low.

Also, to keep the computation bounded in some examples, the actions of RL agent 226 can be limited to a number of regions 214. For example, the number of regions 214 included in each of vectors 215b can be set not to exceed a maximum number of regions ($N_{max}$). That is, the actions of the RL agent 226 can be limited by $N_{REM\_DIST} \in [1, N_{max}]$, where $N_{max}$ is a hyperparameter that defines a maximum number of regions. $N_{max}$ can be selected to balance effectiveness and accuracy of prediction against usage of computation resource (e.g., increased effectiveness and accuracy may require increased computation resource usage). In an example implementation, $N_{max}$ can be set to 8 for an image having a size of 224×224 pixels with regions having sizes of 2×2 pixels. However, the number N can be any number desired, for example, 6, 1, 0, etc.

As alluded to above, RL agent 226 receives reward information 245 from the ML model 242 for a current iteration for use in a next iteration. The reward information 245 can be based on a probability dilution metric (PD), which measures the extent to which classification probabilities drift due to a previous action to a current action. The difference between the PD ($\Delta$PD) of the candidate adversarial image 232 and the input image as a result of an action represents a measure of the effectiveness of the action (e.g., classifications based on candidate adversarial image 232). The change in $L_2$-norm distance ($\Delta L_2$-norm) represents a measure of the distortion added in the candidate adversarial image 232 and can be considered the cost for that action. Thus, reward information 245 can be defined by the normalized PD as represented as follows:

$$Rt = \Delta PDnormalized = -\Delta PD / \Delta L_2 \qquad \text{Eq. 2}$$

The change in the distribution of the probabilities across classes is used to update the $LIST_{PROB}$ vector of state information 215 at each step. By updating the state information 215, the RL agent 226 can choose an optimum action for every step, while maintaining the $L_p$ norms and the number of step/queries at a minimum. A discount factor Y can be applied to the reward information 245 at the RL operation 220 to weight current rewards relative to rewards from previous steps. For example, the discount factor can be applied to reduce the reliance on previous steps in favor of a current step. In an example implementation, a discount factor $\gamma$=0.95 can be obtained through hyperparameter tuning.

Figure 4A:
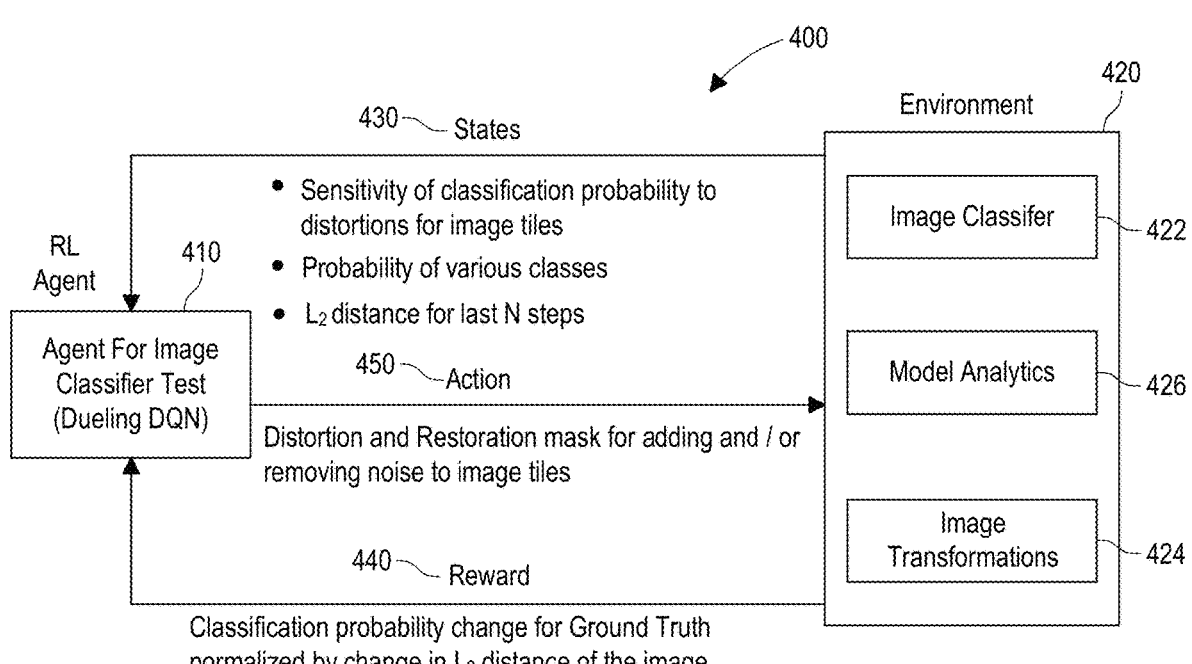
FIG. 4A illustrates an example process for training a Reinforcement Learning agent in accordance with implementations of the present disclosure.

FIG. 4A illustrates an example process 400 for training an RL agent in accordance with implementations of the present disclosure. Process 400 provides an example of reinforcement learning for RL agent 410 for learning an optimal, or nearly optimal, policy that maximizes a reward function. For example, the RL agent 410 is provided as an ML algorithm that interacts with an environment 420 in discrete time steps. At each time step t, the RL agent 410 receives current states 430 and a reward 440 from the environment 420. The RL agent 410 chooses an action 450 from a set of available actions, which is sent to the environment 420. The environment 420 moves to a new state and determines an updated reward associated with the transition. The goal of the RL agent 410 is to learn a policy which maximizes the cumulative reward.

The RL agent 410 may be implemented as RL agent 226 and/or RL agent 120 described above. As shown in FIG. 4A, the states 430 may be provided as sensitivity information for the regions of an input image (e.g., $LIST_{ADD}$ and $LIST_{REMOVE}$), probabilities for a number of classes (e.g., $LIST_{PROB}$), and $L_2$-norm distances for the last N steps (e.g., $LIST_{L2}$). That is, states 430 may be state information 215 as described above. The reward 440 may be provided Equation 2 as described above (e.g., as reward information 245) and the actions 450 are the identification of a number of regions to act upon and whether to add or remove distortions as set forth above.

The environment 420 may comprise an image classifier module 422, which may be an example of a classification model that can be or be included as part of the ML model 242 and/or ML model 130 described above. The image classifier module 422 can be configured to compute probabilities for the ground truth class and non-ground truth classes. The probabilities for the ground truth class and non-ground truth classes can be provided to the RL agent 410 as states 430.

The environment 420 also includes an image transformations module 424 and a model analytics module 426. The image transformations module 424 can be configured to select distortions to be considered and adds/removes the selected distortions to input data according to actions received from the RL agent 410. The model analytics module 426 that can be configured to compute metrics, such as but not limited to, probability dilutions and $L_p$-norms, along with other metrics, which can be used for inference and as part of the reward and actions. The model analytics module 426 may be configured to function as described in connection with the sensitivity analyzer 110 and/or classification evaluator engine 140. Thus, model analytics module 426 may be configured to compute sensitivity information of the image classifier module 422, in classifying an input, to distortions, which can be provided as states 430. Model analytics module 426 can also calculate a measure of the total distortion added provided as a $L_2$-norm for the computed probabilities as states 430, as well as reward 440 as changes in classification probabilities change for ground truth normalized by change in $L_2$ distance of the input, as described in Equation 2 above.

In an example implementation, the RL agent 410 can be a Dueling Deep Q Network (DQN) algorithm-based RL agent, which evaluates the image classification module 422 for robustness. The Dueling DQN model, as known in the art, can be applied to the actions of a limited number of possible values of $N_{ADD\_DIST}$ and $N_{REM\_DIST}$ and can be effective for prediction with a reasonably bounded training. Below is an example of pseudo code that provides an example training procedure for a Dueling DQN RL agent:

| | Algorithm 1: RLAB: Reinforcement Learning Training |
|---|---|
| 1 | Initialization: Policy parameters |
| 2 | Input: Validation set, number of iterations $Max_{iter} = 3500$ |
| 3 | Output: Optimized policy for Dueling DQN |
| 4 | for image in validation set do |
| 5 |    Load the image; |
| 6 |    Calculate reward $R_t$ and advantage $\hat{A}_t$ based on current value function; |
| 7 |    Calculate sensitivity of ground truth classification probability $P_{GT}$ to change in distortion for square patches; |
| 8 |    $i \leftarrow 0$; |
| 9 |    $Pred_{fstep} \leftarrow 1 - P_{GT}$; |
| 10 |    while $Pred_{GT} == Pred_{fstep}$ and $i < Max_{iter}$ do |
| 11 |       Collect set of trajectories (state, action) by running policy $\pi_k = \pi(\theta_k)$ in the environment → action $(N_{add\_dtei}, N_{rem\_dtei})$; |
| 12 |       Calculate reward $R_t$ and TD error; |
| 13 |       Update the DQN policy; |
| 14 |       Compute/take action and perform prediction $Pred_{fstep}$; |
| 15 |       $i \leftarrow i + 1$; |
| 16 |    end |
| 17 | end |

Figure 4B:
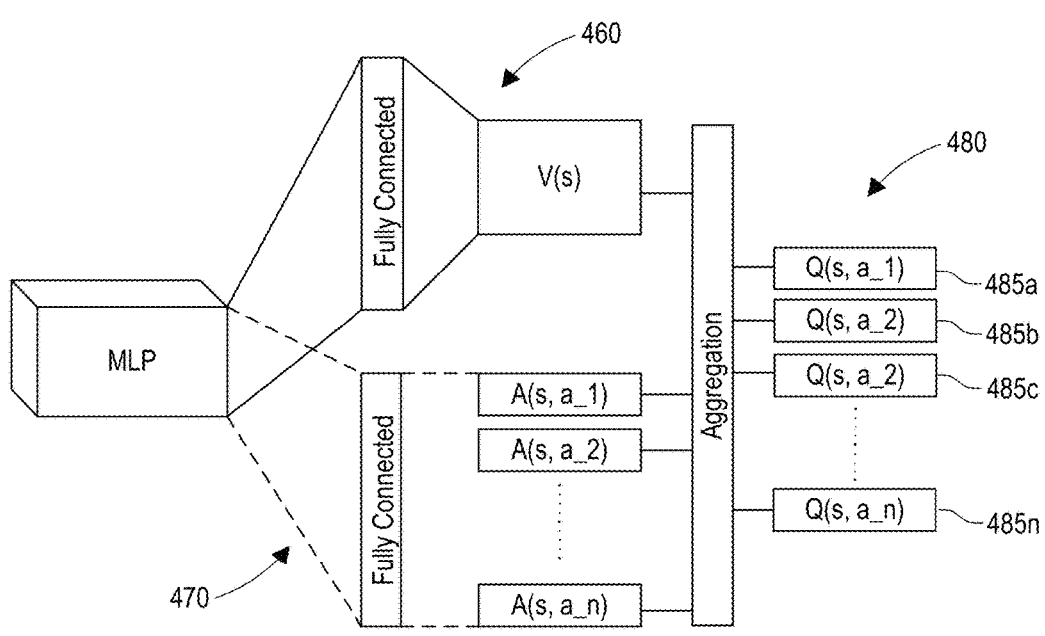
FIG. 4B illustrates an example Dueling Deep Q Network that can be utilized in accordance with implementations of the present disclosure.

The Dueling DQN algorithm splits Q-values into two parts: a value function V(s) and an advantage function A(s, a), where s represents the states 430 and a represents the actions 450. FIG. 4B illustrates an example Dueling DQN, in which the same neural network (NN) splits its last layer into two parts, a first part 460 and a second part 470. The first part 460 estimates the state value function for states (V(s)) and the second part 470 estimates state-dependent action advantage (A(s, a)). The NN then combines both parts into a single output 480, estimating Q-values 485a-485n. So just learning the state-value function (V(s)) can be enough in some cases. Another benefit is generalizing learning across actions without imposing specific changes to the underlying reinforcement learning algorithm.

In some implementations, with reference back to FIG. 2, an image cleanup operation 260 can be performed after a misclassification is identified. Image cleanup operation 260 may be a post processing step that reduces the total added distortion ($L_2$-norm), while maintaining the misclassification. That is, image cleanup operation 260 may operate to remove distortions from candidate adversarial image 232, without flipping the misclassification back to the ground truth class. For example, image clean up can be performed by calculating a reverse sensitivity, and the regions having the maximum reverse sensitivity can be identified and distortions that were added therein by the RL agent 226 can be removed. Reverse sensitivity can be computed as follows:

$$Reverse_{sensitivity} = -\Delta L_2 / \Delta PD \qquad \text{Eq. 3}$$

Figure 5:
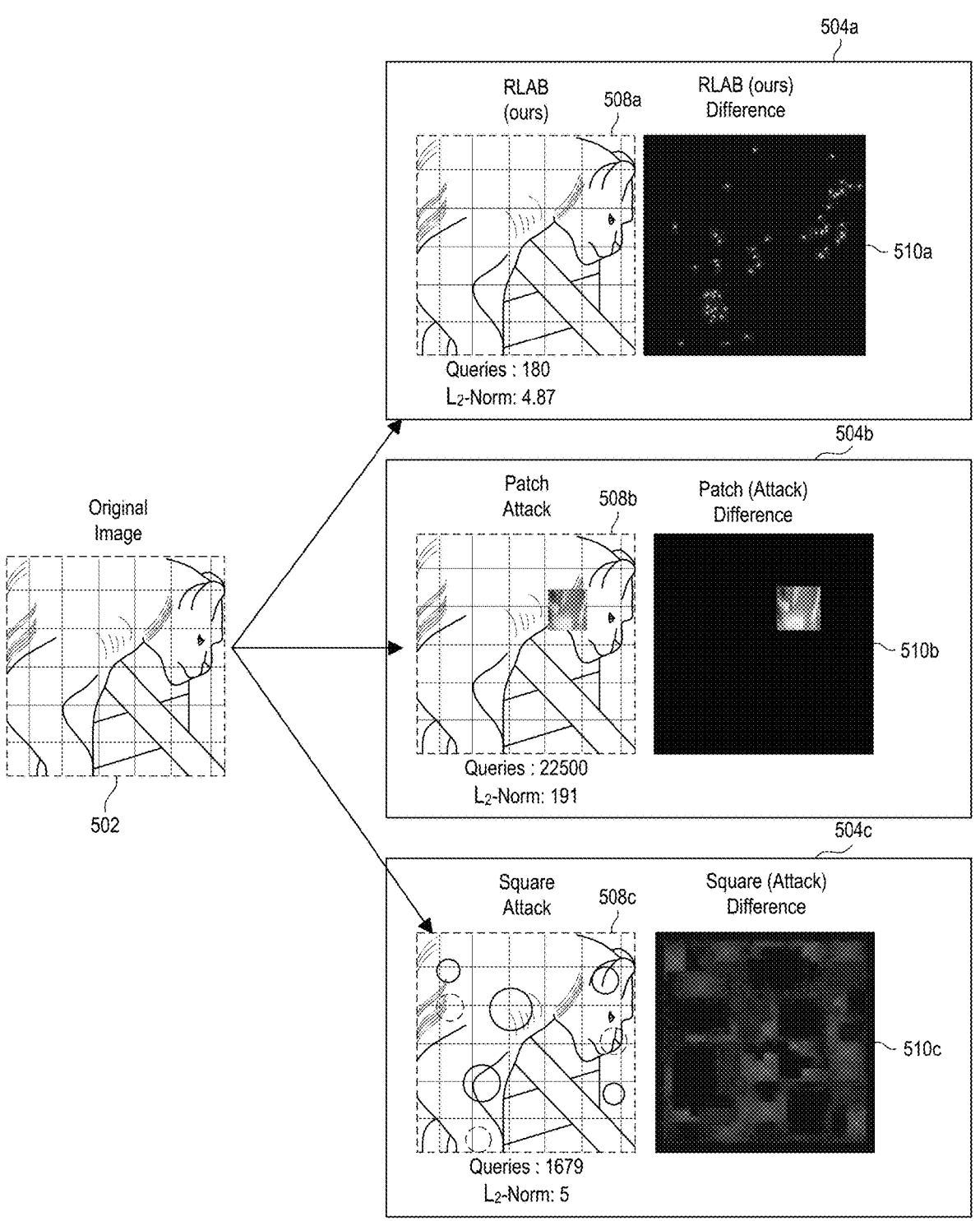
FIG. 5 illustrates a comparison between adversarial images generated by different approaches for adversarial attacks.

FIG. 5 illustrates a comparison between adversarial images generated by different approaches for adversarial attacks. For example, FIG. 5 illustrates an original image 502 provided to three different adversarial attack 504a-504c that generate adversarial samples 508a-508c. A corresponding difference map 510a-510c is provided that illustrates a difference between the original input mage 502 and each adversarial samples 508a-508c. Approach 504a corresponds to the RLAB platform disclosed herein (e.g., as RLAB platform 100 and/or process flow 200), while approaches

504*b* and 504*c* correspond to prior art approaches: patch attack and square attack, respectively. As can be seen from the adversarial samples 508*a*-508*c*, each approach creates an misclassification having distortions contained therein (as represented by the difference maps 510*a*-510*b*). However, as seen in difference map 510*a* and adversarial sample 508*a*, the distortions added by the disclosed implementations are significantly less perceptible by the human eye.

Additionally, patch attack uses completely unnatural squared patches that are specifically generated for the patch attack implementation, as shown in FIG. 5. This is in contrast to the naturally occurring distortions leveraged by the RLAB platform disclosed herein. Moreover, the distortions measured in $L_2$-norm for patch attack is 191 when applied to a ReNet-50 model trained on the ImageNet dataset. This $L_2$-norm is significantly higher than obtained by the disclosed implementations, which provide an $L_2$-norm of 4.87 on the same model and dataset. Further, patch attack obtains the above $L_2$-norm using 22500 queries, compared to the 180 queries used by the implementations disclosed herein.

The reduced number of queries with a reduced total distortion (e.g., $L_2$-norm distance), as well as reduced complexity of computations, obtained by the presently disclosed technology may be attributable to the dual actions performed by the RL agents disclosed herein. The dual action comes in the form of the addition and removal of distortions. For example, generating adversarial samples for classification through multiple steps can be considered similar to actions on a board game. For board games, the most effective moves (e.g., actions) are figured out through a Deep Tree Search (DTS) of multiple layers at the current step on a longer time horizon as the game evolves. DTS can be computationally expensive, even with approximations like Monte Carlo Tree Search (MCTS). But unlike a board game, in the disclosed technology, there is a possibility to reset the earlier actions when the previously taken action turns out to be less optimal than initially thought. In the examples disclosed herein, this can be accomplished by removing distortions from regions to which distortions were added during a previous step (e.g., iteration) and adding distortions to other regions, both of which are based on the state of the input image at a current step. This can be considered akin to replaying all the actions in one step, while keeping the sensitivity analysis restricted to the current state of the image without a tree search.

Accordingly, along with the reduced number of queries and $L_2$-norm distance, the disclosed technology can also reduce the computation complexity relative to the conventional approaches. For example, complexity of a conventional approach can be represented as $O(N^d)$, where N represents the computation complexity of one iteration and corresponds to the input data size and d represents the depth of the tree search. The depth of the tree search translates to how many queries and actions to look ahead if performing a conventional a tree search (e.g., d=[1, max steps]). The implementation disclosed herein can reduce this complexity to $O(N)$.

As alluded to above, implementations disclosed herein can use an adversarial sample, such as adversarial sample 270 and/or adversarial data 145, to quantify a robustness of an ML model. For example, upon determining a misclassification at comparison operation 250 of FIG. 2, process flow 200 can measure the robustness of the ML model 242 as the total distortion (e.g., $L_2$-norm distance from original input image) of adversarial sample 270, which represents the total added distortion added to the original input image. This measure of total distortion, provided as $L_2$-norm distance, can be representative of the robustness of the ML model, because this measure provides for the total distortion required to induce the ML model to misclassify the image.

As another example, the implementations disclosed herein can use an adversarial sample, such as adversarial sample 270 and/or adversarial data 145, to retrain the ML model for model refinement and increased robustness. For example, retraining on adversarial samples that contain a minimum amount of natural distortions at regions of the input image for which the ML model is particularly sensitivity to, can improve the ML models accuracy in classification through training on these specific distortions and sensitive regions. After the retraining, the trustworthiness of the ML model can be increased with higher accuracy and robustness.

Figure 6:
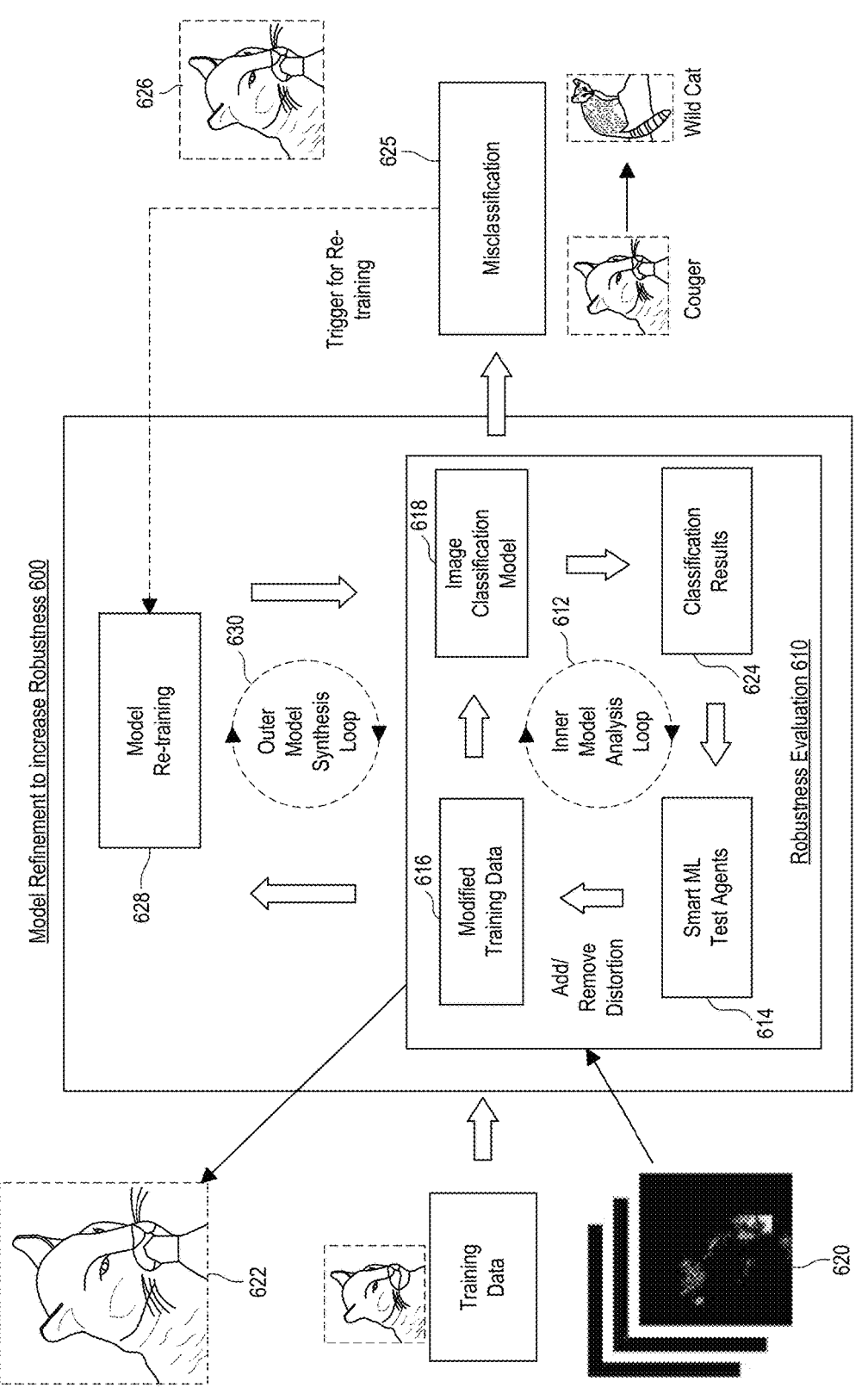
FIG. 6 provides an example architecture for robustness evaluation and/or model refinement in accordance with implementations of the present disclosure.

FIG. 6 provides an example architecture 600 for robustness evaluation and/or model refinement in accordance with implementations of the present disclosure. Architecture 600 includes a robustness evaluation system 610 in which an input image 602 can be supplied to an inner ML model analysis loop 612 as training data. This loop includes execution of a smart ML test agent 614 that obtains sensitivity information and regions on the input image in which to add and remove distortions. Smart ML test agent 614 may be an example of RL agent 120 and/or RL agent 226 described above. Determinations from smart ML test agent 614 are provided as distortion masks 620 and used to modify the input image at modified training data 616 to generate a candidate adversarial image 622. An example candidate adversarial image 622 is shown in FIG. 6, in which the mouth area of a cougar is altered according to distortion masks 620. The candidate adversarial image 622 is then supplied to an image classification model 618 (e.g., ML model 130 and/or 242), which computes probabilities for the ground truth class (e.g., a cougar) and non-ground truth classes. Image classification model 618 generates classification results 624, which can be used to infer a class for the input image 602. The classification results 624 are validated, and, if the image classification model 618 correctly classified the input image 602, the inner ML model analysis loop 612 is repeated with the candidate adversarial image 622 as the input image. In one example, inner ML model analysis loop 612 may be implemented as process flow 200, except that certain steps are not shown in FIG. 6 for illustrative purposes only.

If a misclassification 625 occurs, the misclassified image is output as an adversarial image 626. In the illustrative example of FIG. 6, the candidate adversarial image 622 is classified as a wild cat instead of a cougar. In one example, architecture 600 can compute a measure of robustness from the adversarial image 626 as the $L_2$ distance between the adversarial image 626 and the original input image 602. In another example, shown in FIG. 6, the adversarial image 626 can be supplied back to the image classification model for model retraining 628, as part of an outer model synthesis loop 630. That is, for example, adversarial image 626 can be provided as training data or used to update training data and supplied to the image classification model to retrain the model.

While separate blocks are shown for model retraining 628 and image classification model 618, this is for illustrative purposes only. The image classification model 618 can be retrained on adversarial image 626 at model retraining 628. Once retrained, the inner ML model analysis loop 612 can be repeated again to generate another adversarial image 626, which can then be applied for model retraining 628. As such, the synthesis loop 630 can be iteratively performed to provide model refinement. The robustness evaluation can be calculated at any point along the various steps, such as but not limited to, at each adversarial image 626, at any one or more adversarial images 626 as desired, at a final adversarial image 626. In another example, robustness evaluation need not be computed as desired. Similarly, refinement of the classification model at model retraining 628 need not be performed if not desired for a given application.

FIG. 7 illustrates an example computing component that may be used to implement adversarial black-box attacks in accordance with various embodiments. Referring now to FIG. 7, computing component 700 may be, for example, a server computer, a controller, or any other similar computing component capable of processing data. In the example implementation of FIG. 7, the computing component 700 includes a hardware processor 702, and machine-readable storage medium 704.

Hardware processor 702 may be one or more central processing units (CPUs), semiconductor-based micropro-cessors, and/or other hardware devices suitable for retrieval and execution of instructions stored in machine-readable storage medium 704. Hardware processor 702 may fetch, decode, and execute instructions, such as instructions 706-714, to control processes or operations for adversarial black-box attacks. As an alternative or in addition to retrieving and executing instructions, hardware processor 702 may include one or more electronic circuits that include electronic com-ponents for performing the functionality of one or more instructions, such as a field programmable gate array (FPGA), application specific integrated circuit (ASIC), or other electronic circuits.

A machine-readable storage medium, such as machine-readable storage medium 704, may be any electronic, mag-netic, optical, or other physical storage device that contains or stores executable instructions. Thus, machine-readable storage medium 704 may be, for example, Random Access Memory (RAM), non-volatile RAM (NVRAM), an Electri-cally Erasable Programmable Read-Only Memory (EE-PROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-7014.

Hardware processor 702 may execute instruction 706 to receive an image comprising an object, the object corre-sponding to a ground truth, as described above in connection with FIGS. 1 and 2.

Hardware processor 702 may execute instruction 708 to compute a first sensitivity of a machine learning model, in classifying the object as the ground truth, with an addition of distortion and a second sensitivity of the machine learning model in classifying the object as the ground truth with a removal of distortion. Examples of this instruction are provided above in connection with FIGS. 1 and 2. In some examples, the image is divided into a plurality of regions. A first one or more regions of the plurality of regions into which the first one or more distortions are added are deter-mined based on the first sensitivity and a second one or more regions of the plurality of regions from which the second one or more distortions are removed can be determined based on the second sensitivity. From this, the first sensitivity and second sensitivity can be computed for each region of the plurality of regions.

In various examples, the first and second sensitivity can be provided to an RL agent as states. The RL agent may be implemented as RL agent 120 of FIG. 1, RL operation 220 of FIG. 2, RL agent 410 of FIG. 4A, and/or smart ML test agent 614 of FIG. 6. The states may also include probabili-ties of classification class, including a ground truth class, and total distortions (e.g., $L_2$-norm) as described above in connection with FIGS. 1, 2, and 4A.

Hardware processor 702 may execute instruction 710 to add a first one or more distortions to the image based on the first sensitivity, for example, as described above in connec-tion with FIGS. 1 and 2. In an example implementation, the RL agent discussed above may determine where in the image to add distortions, an amount of distortion to add (e.g., measured by $L_2$-norm), and which type or types of distor-tions to add, for example, as described above in connection with FIGS. 1, 2, and 4A. This determination may be made based on states above, as described in connection with FIGS. 2 and 4A, and may be provided to the machine learning model as actions. These actions may include a masked for adding distortion to the image, as described above in con-nection with FIG. 2.

Hardware processor 702 may execute instruction 712 to remove a second one or more distortions from the image based on the second sensitivity, for example, as described above in connection with FIGS. 1 and 2. In an example implementation, the RL agent discussed above may deter-mine where, within the image, to remove previously added distortions and an amount of distortion to remove (e.g., measured by $L_2$-norm), for example, as described above in connection with FIGS. 1, 2, and 4A. This determination may be made based on states above, as described in connection with FIGS. 2 and 4A, and may be provided to the machine learning model as actions. These actions may include a mask for removing distortion from the image, as described above in connection with FIG. 2. The masks may be applied to the image to generate a modified or altered image, as discussed above in connection with FIG. 2, which can be supplied to the machine learning model. In an example, as discussed above in connection with FIG. 4A, an image transformations module may be executed to generate the altered image according to the actions received from the RL agent.

Hardware processor 702 may execute instruction 714 to classify, by the machine learning model, the object based on the added and removed distortions, for example, as described above in connection with FIGS. 1 and 2. Com-puting of the first and second sensitivities, adding the first one or more distortions, and removing the second one or more distortions, can be repeated until the machine learning model misclassifies the object. In some examples, classify-ing the object comprises computing a ground truth prob-ability that the object is the ground truth and a measure of total distortion added to the image.

In some examples, a reward for each iteration can be computed based on a change in ground truth probability with respect to a preceding iteration and a change in total distor-tion added with respect to the preceding iteration. In this case, classifying by the machine learning model can be based on the reward.

Figure 8:
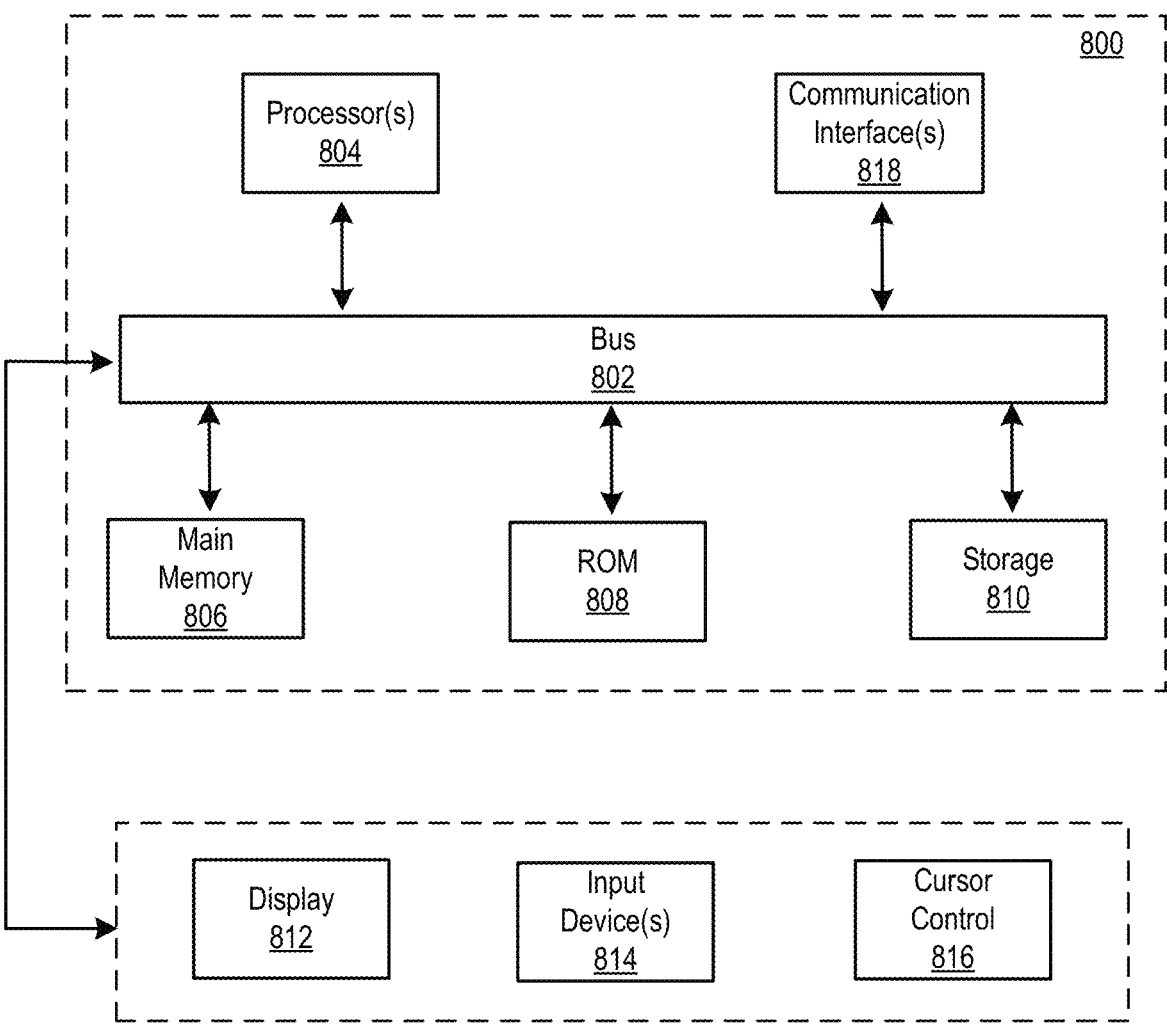
FIG. 8 is an example computer system that may be used to implement various features of adversarial black-box attacks of the present disclosure.

FIG. 8 depicts a block diagram of an example computer system 800 in which various of the embodiments described herein may be implemented. Computer system 800 may be implemented to execute RLAB platform 100 and/or process flow 200 as described above. The computer system 800 includes a bus 802 or other communication mechanism for communicating information, one or more hardware proces-sors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions. Instructions may be executed by processor 804 to perform the operations described in connection with FIG. 2

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:

receiving an image comprising an object, the object corresponding to a ground truth;

computing a first sensitivity of a machine learning model in classifying the object as the ground truth with an addition of distortion and a second sensitivity of the machine learning model in classifying the object as the ground truth with a removal of distortion;

adding a first one or more distortions to the image based on the first sensitivity;

removing a second one or more distortions from the image based on the second sensitivity; and classifying, by the machine learning model, the object based on the added and removed distortions, wherein the computing of the first and second sensitivities, adding the first one or more distortions, and removing the second one or more distortions, are repeated until the machine learning model misclassifies the object.

2. The method of claim 1, further comprising:

dividing the image into a plurality of regions;

determining a first one or more regions of the plurality of regions into which the first one or more distortions are added based on the first sensitivity; and determining a second one or more regions of the plurality of regions from which the second one or more distortions are removed based on the second sensitivity, wherein computing the first sensitivity and second sensitivity are computed for each region of the plurality of regions.

3. The method of claim 1, wherein classifying the object comprises computing a ground truth probability that the object is the ground truth and a measure of total distortion added to the image, wherein the total distortion added to the image is the second one or more distortions subtracted from the first one or more distortions.

4. The method of claim 1, further comprising:

computing a reward for each iteration based on a change in ground truth probability with respect to a preceding iteration and a change in total distortion added with respect to the preceding iteration, wherein the classifying by the machine learning model is based on the reward.

5. The method of claim 1, wherein classifying the object comprises computing a ground truth probability that the object is the ground truth and a probability that the object is another object, wherein misclassifying the object comprising the probability being greater than the ground truth probability.

6. The method of claim 1, further comprising:

computing a measure of robustness of the machine learning model based on a total distortion when the machine learning model misclassifies the object.

7. A system, comprising:

a memory configured to store instructions; and a processor coupled to the memory and configured to execute the instructions to:

receive an image comprising an object, the object corresponding to a ground truth;

compute a first sensitivity of a machine learning model in classifying the object as the ground truth with an addition of distortion and a second sensitivity of the machine learning model in classifying the object as the ground truth with a removal of distortion;

add a first one or more distortions to the image based on the first sensitivity;

remove a second one or more distortions from the image based on the second sensitivity; and classify, by the machine learning model, the object based on the added and removed distortions, wherein the computing of the first and second sensitivities, adding the first one or more distortions, and removing the second one or more distortions, are repeated until the machine learning model misclassifies the object.

8. The system of claim 7, wherein the processor is further configured to:

divide the image into a plurality of regions;

determine a first one or more regions of the plurality of regions into which the first one or more distortions are added based on the first sensitivity; and determine a second one or more regions of the plurality of regions from which the second one or more distortions are removed based on the second sensitivity, wherein computing the first sensitivity and second sensitivity are computed for each region of the plurality of regions.

9. The system of claim 7, wherein classifying the object comprises computing a ground truth probability that the object is the ground truth and a measure of total distortion added to the image, wherein the total distortion added to the image is the second one or more distortions subtracted from the first one or more distortions.

10. The system of claim 7, wherein the processor is further configured to:

compute a reward for each iteration based on a change in ground truth probability with respect to a preceding iteration and a change in total distortion added with respect to the preceding iteration, wherein the classifying by the machine learning model is based on the reward.

11. The system of claim 7, wherein classifying the object comprises computing a ground truth probability that the object is the ground truth and a probability that the object is another object, wherein misclassifying the object comprising the probability being greater than the ground truth probability.

12. The system of claim 7, wherein the processor is further configured to:

computing a measure of robustness of the machine learning model based on a total distortion when the machine learning model misclassifies the object.

13. A non-transitory computer readable storage medium having instructions that when executed cause a processor to:

receive an image comprising an object, the object corresponding to a ground truth;

compute a first sensitivity of a machine learning model in classifying the object as the ground truth with an addition of distortion and a second sensitivity of the machine learning model in classifying the object as the ground truth with a removal of distortion;

add a first one or more distortions to the image based on the first sensitivity;

remove a second one or more distortions from the image based on the second sensitivity; and classify, by the machine learning model, the object based on the added and removed distortions, wherein the computing of the first and second sensitivities, adding the first one or more distortions, and removing the second one or more distortions, are repeated until the machine learning model misclassifies the object.

14. The computer readable storage medium of claim 13, further comprising the processor to:

divide the image into a plurality of regions;

determine a first one or more regions of the plurality of regions into which the first one or more distortions are added based on the first sensitivity; and determine a second one or more regions of the plurality of regions from which the second one or more distortions are removed based on the second sensitivity, wherein computing the first sensitivity and second sensitivity are computed for each region of the plurality of regions.

15. The computer readable storage medium of claim 13, wherein classifying the object comprises computing a ground truth probability that the object is the ground truth and a measure of total distortion added to the image, wherein the total distortion added to the image is the second one or more distortions subtracted from the first one or more distortions.

16. The computer readable storage medium of claim 13, further comprising the processor to:

compute a reward for each iteration based on a change in ground truth probability with respect to a preceding iteration and a change in total distortion added with respect to the preceding iteration, wherein the classifying by the machine learning model is based on the reward.

17. The computer readable storage medium of claim 13, wherein classifying the object comprises computing a ground truth probability that the object is the ground truth and a probability that the object is another object, wherein misclassifying the object comprising the probability being greater than the ground truth probability.

18. The computer readable storage medium of claim 13, further comprising the processor to:

compute a measure of robustness of the machine learning model based on a total distortion when the machine learning model misclassifies the object.

* * * * *